March 29, 1949. N. MORRIS 2,465,389
HEATING AND COOLING APPARATUS
Original Filed April 26, 1944 4 Sheets-Sheet 1
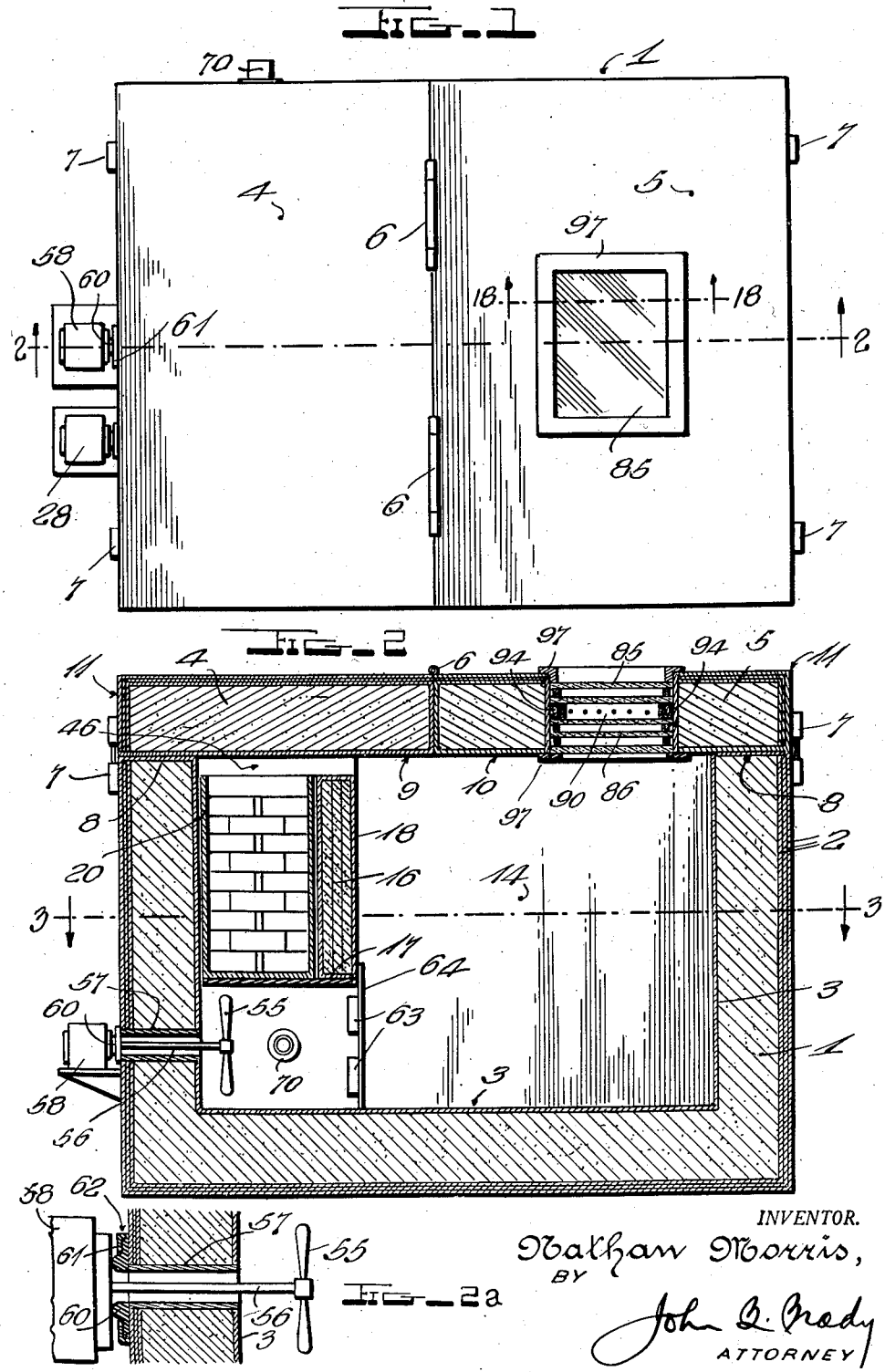
INVENTOR.
Nathan Morris,
BY
John B. Brady
ATTORNEY

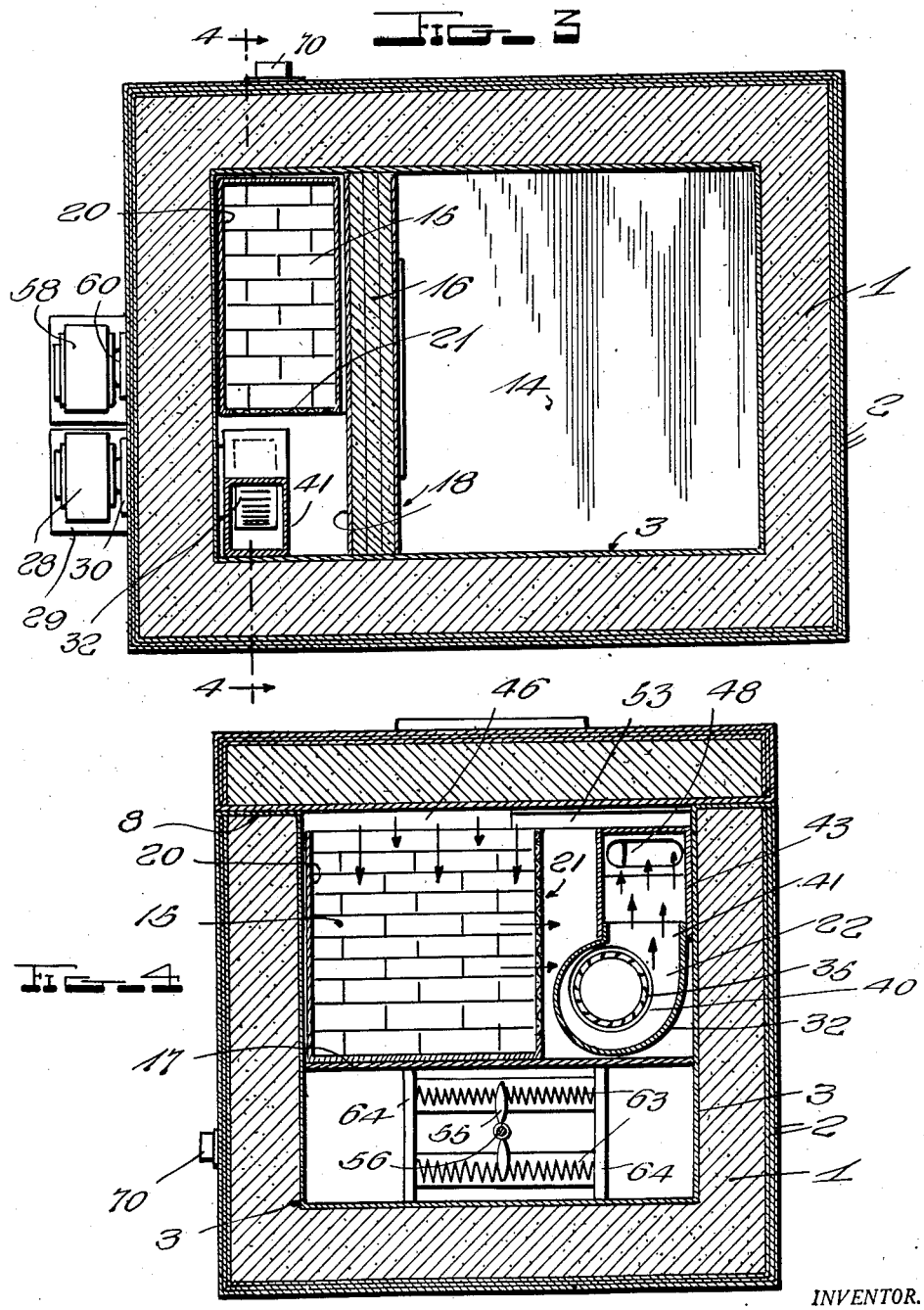

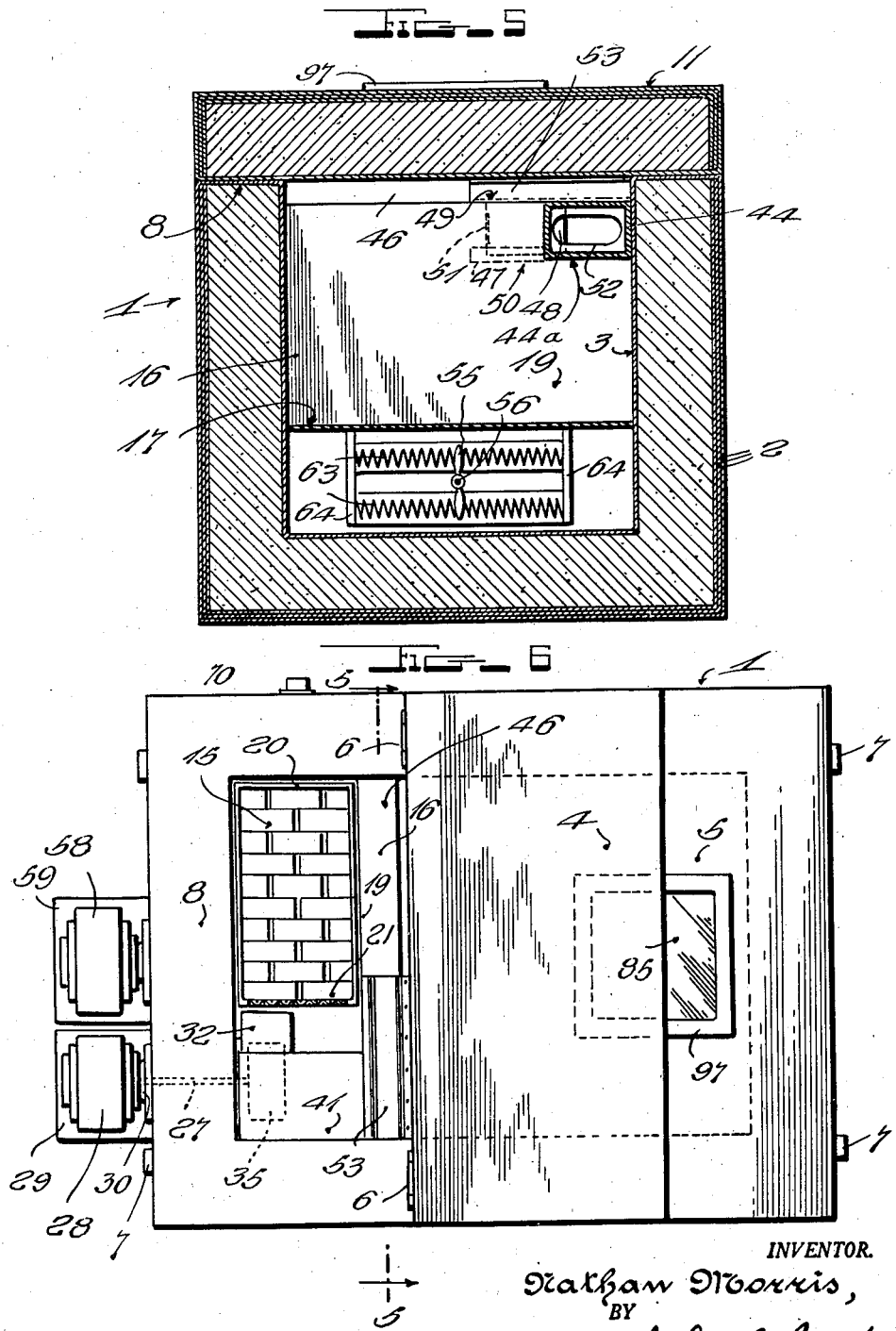

March 29, 1949.　　　　N. MORRIS　　　　2,465,389
HEATING AND COOLING APPARATUS
Original Filed April 26, 1944　　　　4 Sheets-Sheet 4
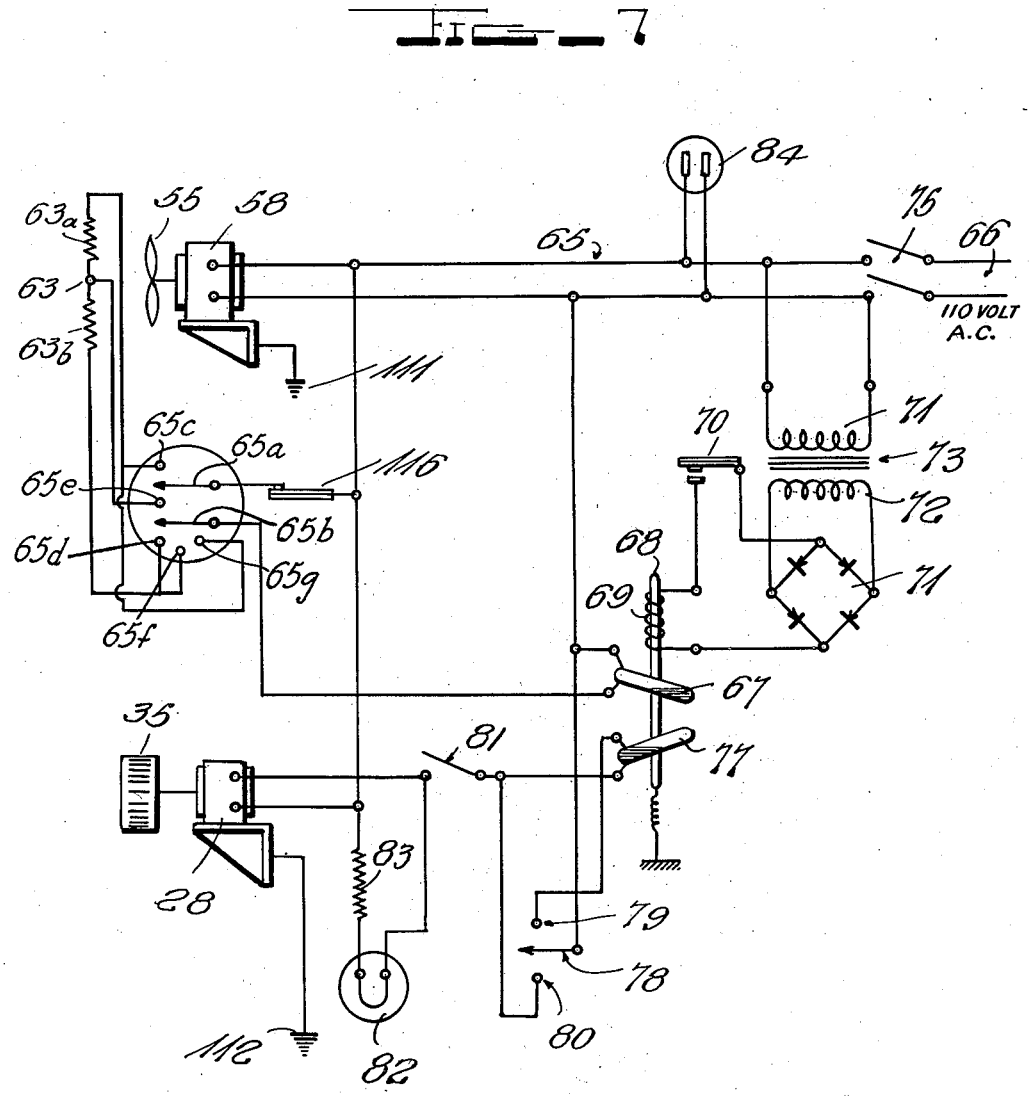

Patented Mar. 29, 1949

2,465,389

UNITED STATES PATENT OFFICE 2,465,389

HEATING AND COOLING APPARATUS

Nathan Morris, Silver Spring, Md., assignor, by mesne assignments, to American Instrument Co., Inc., a corporation of Maryland Original application April 26, 1944, Serial No. 532,807. Divided and this application August 3, 1945, Serial No. 608,623

7 Claims. (Cl. 257—3)

My invention relates broadly to heating and cooling apparatus and more particularly to the system and apparatus for producing accurately controlled temperatures.

This application is a division of my application Serial Number 532,807 filed April 26, 1944 for Refrigeration apparatus.

One of the objects of my invention is to provide a method of controlling extremely low temperatures in a refrigeration cabinet with a high degree of precision.

Another object of my invention is to provide a construction of apparatus for producing and maintaining relatively low temperatures in a cabinet utilizing solidified gas as the refrigerant.

Still another object of my invention is to provide a refrigeration apparatus having a solidified gas refrigeration cabinet with a circulator therein for cyclically pumping low temperature gas through a work chamber.

A further object of my invention is to provide a novel control system for refrigeration apparatus whereby heat or fluid circulation may be intermittently controlled for maintaining the temperature within a refrigeration cabinet substantially constant.

A further object of my invention is to provide a system of dual fan operation for low temperature refrigeration cabinets with means for cooperatively controlling the operation of the fans whereby one of the fans may be constantly driven for maintaining circulation of the refrigerating gas within the cabinet while the other of the fans is intermittently driven according to the temperature requirements for the particular work being performed within the cabinet.

Other and further objects of my invention reside in the method of operation and control arrangement set forth in the specification hereinafter following by reference to the accompanying drawings in which:

Figure 1 is a plan view of one construction of refrigeration apparatus embodying my invention; Fig. 2 is a vertical sectional view taken on line 2—2 of Fig. 1; Fig. 2a is a detailed view showing one arrangement of sealing the entrance way for the shaft which connects one of the external driving motors to one of the gas circulating fans in the cabinet structure; Fig. 3 is a horizontal sectional view through the cabinet structure taken substantially on line 3—3 of Fig. 2; Fig. 4 is a transverse vertical sectional view taken through the cabinet structure substantially on line 4—4 of Fig. 3; Fig. 5 is a vertical sectional view through the cabinet structure taken substantially on line 5—5 of Fig. 6; Fig. 6 is a plan view similar to the plan view of Fig. 1, but illustrating one section of the hinged top of the cabinet opened to show the interior of the dry ice compartment; and Fig. 7 is a wiring diagram illustrating the electrical circuit arrangement for the control units employed in the refrigeration system of my invention.

Referring to the drawings in more detail reference character 1 designates the refrigeration cabinet embodying my invention and in which laminated insulation material having high heat insulation properties constitutes the wall structure of approximately six inches in thickness. The insulation material is covered externally by suitable heat insulation surfacing material such as laminated board represented at 2. The interior of the cabinet is provided with a metallic lining represented at 3 which has all joints well filled and caulked to eliminate insofar as is practicable the loss of refrigeration by heat transfer through the walls of the cabinet. A cover formed in sections represented at 4 and 5 hinged together as represented at 6 extends over the cabinet structure and is secured in tight sealed relation thereto by hasps 7 which when forced into securing position insure a gas-tight joint between the metallic peripheral extension 8 of the lining 3 and the metallic facing 9 and 10 of the cover sections 4 and 5. The cover sections 4 and 5 are constructed in a manner similar to the construction of the main cabinet in that the internal laminated heat insulation is faced on its lower surface by metallic material 9 and 10 and covered on the peripheral edges and upper surface by laminated wood or other insulation material indicated at 11.

The interior of the cabinet is divided into a work chamber represented at 14 and a Dry Ice compartment represented at 15 by means of a partition 16 of insulation material. The partition 16 extends transversely of the interior of the cabinet termination above the bottom of the cabinet at 17. The partition is formed from laminated insulation material enclosed by metallic sheet-like material represented at 18, one surface of which forms the transverse wall of the work compartment 14 and the opposite surface of which 19 constitutes one wall of the Dry Ice compartment which terminates at the level 17 is arranged to receive a basket or box-like carrier represented at 20 that is provided with an openwork mesh-like side 21 at one end thereof for the free circulation of gases under control of the blower represented generally at 22.

The blower includes mounting means which is suitably secured through the interior side wall of the cabinet. Drive shaft 27 is connected to motor 28 supported externally of the cabinet on suitable mounting bracket 29. A sealing gland is provided between motor 28 and the external side wall of the cabinet as represented at 30 for preventing loss of refrigeration. The sealing gland comprises a substantially resilient gasket which is compressed between the end of the motor frame 28 and the side wall of the cabinet for substantially preventing heat exchange through the tubular member 26.

The intake for gases is established through the center aperture 40 of the housing which is in close proximity with the open mesh side wall 21 of the Dry Ice container 20. The delivery end of the fan 35 is connected to the duct system 41 which, when the fan housing is properly mounted in position, extends vertically in the Dry Ice compartment and forms a slip connection coupling means with the depending end 42 of the elbow 43 of horizontally extending duct 44. The horizontally extending duct 44 is constructed internally for reducing friction to gas flow through the duct system. The end of the horizontally extending duct 44 projects through a recess 44a formed in the partition 16 and projects into the upper portion of the work compartment 14. The end of the duct 44 is provided with a transversely extending frame member 47 which fits thereon and serves as a guide for an adjustable plate member 48 which may be adjusted between sets of coacting guide grooves indicated at 49 and 50. The adjustable plate 48 has a projecting finger grip portion 51 enabling the plate to be manually grasped and moved to selected positions to fully open or partially close aperture 52 in plate 47 for thus controlling the volume of gas flow from the refrigeration compartment into the work compartment.

In order to confine the forced gas flow into the work compartment from the refrigeration compartment to the duct system I provide a deflector plate 53 which extends from the top of the guide plate frame 47 to a position establishing sealed relation with the entire surface of the cover section 4. As represented in Fig. 4 the deflector plate 53 extends only partially across the cabinet forcing the gases to pass through the confined space indicated at 46 so that the return gases are free to pass through the elongated slot or recess indicated at 46 in their convection path from the work compartment into the refrigeration compartment.

In addition to the blower 22 which I have described I also provide an arrangement of fan 55 which is mounted below the refrigeration compartment centrally of the interior of the cabinet on shaft 56 which extends through the tubular member 57 in the side wall of the cabinet to the motor 58 supported on bracket 59 on the exterior of the cabinet. A compressible gasket 60 is compressed between the end of tubular sleeve 57 and motor housing 58 for providing a gas-tight seal and preventing heat exchange between the exterior atmosphere and the interior of the cabinet. An annular ring member 61 is secured against the gasket 60 forcing the gasket 60 into tight sealing relation with the end of the motor housing. An annular rim member 62 fits over the ring 61 and gasket 60 as shown. The fan 55 is located beneath the refrigeration compartment and in line with the heaters 63 that are supported on frame 64 that extends transversely of the cabinet immediately adjacent the partition 16. The heaters 63 are constituted by wire coils which may be arranged in sections and electrically connected in series or multiple arrangement for securing different temperature conditions.

In Fig. 7 I have shown the switch system 65 which is mounted in a control box externally of the cabinet for determining the parallel or series arrangement of the wire coils 63a and 63b which comprise the heaters 63. A series circuit may be completed through the wire coils 63a and 63b by moving switch arms 65a and 65b to contacts 65c and 65d, respectively. Either section of the heater may be utilized separately by moving switch arms 65a and 65b to contacts 65e and 65d; or to contacts 65c and 65e, respectively. A parallel arrangement of the wire coils 63a and 63b may be effected by moving switch arm 65b to contact with both contacts 65f and 65g which are wired as shown at the same time that switch arm 65a is moved to contact 65e. Various arrangements of series parallel systems may be employed for completing the circuit connections to the wire coils 63a and 63b. The connection of the heaters into the power supply circuit 66 is controlled by mercury switch 67 actuated by armature 68 controlled by solenoid winding 69 which is energized or de-energized in accordance with the position of the thermostat 70 the control element of which extends into the cabinet as represented in Figs. 2, 3, and 4. The thermostat is connected to the direct current control circuit which includes the rectifier bridge shown at 71 connected to secondary winding 72 of transformer 73 whose primary winding 74 connects to the power supply circuit 66. A main switch 75 is provided for cutting off the entire cabinet electrical service from the power supply line 66 which is usually 110 volts alternating current. The transformer 73 appropriately steps down the power supply to the thermostatic control circuit for operation of solenoid winding 69. Fan motor 58 normally operates continuously although the condition of heat within the work chamber may vary. Such condition is controlled by the cutting on or off of the wire coils 63a and 63b of the heater 63 as the thermostat 70 may determine. Selector switch 65 is manually controlled from the apparatus control panel exterior of the cabinet structure for connecting the wire coils 63a and 63b in parallel in order to obtain maximum temperature conditions or connecting the wire coils 63a and 63b in series in order to obtain lower temperature conditions or to select merely a single wire coil and eliminate the other wire coil from the circuit in order to obtain medium temperature conditions.

In addition to the mercury switch 67 controlled by armature 68 which is operated by solenoid winding 69, I also provide a coacting mercury switch 77 having its contacts connected to selector switch 78 to the power supply line 66 and to the blower motor 28. Selector switch 78 is manually controlled from the apparatus control panel externally of the cabinet structure and when moved to contact 79 places the blower motor under control of mercury switch 77, but when moved to contact 80 eliminates the control of blower motor 28 from contacts 77 and allows the blower motor 28 to run continuously except as may be determined by the externally manually controlled switch 81 mounted on the apparatus panel. An alternative of this arrangement includes a provision of resistors allowing blower motor 28 to be continuously controlled by mercury switch 77 at different speeds. The manually operated switch 81 when closed places blower motor 28 under control of the set of contacts in mercury switch 77 assuming manually controlled switch 78 to be moved to contact 79. So long as blower motor 28 is operating pilot lamp 82 is lighted through suitable power reducing resistor 83, the pilot lamp 82 and resistor 83 combination being effectively in parallel with blower motor 28 and the power supply line 66. Without pilot lamp 82 operating on the apparatus control panel externally of the cabinet, the operating condition of blower motor 28 cannot readily be determined inasmuch as observation into the cabinet from the exterior thereof is restricted to a relatively small observing window and the sound of the running motor within the cabinet is substantially muffled by the cabinet structure. A suitable convenience outlet represented at 84 is connected in a shunt with the power supply line 66 and mounted on the apparatus control panel externally of the cabinet structure.

The cabinet is installed in a location away from heated radiators or direct sun light. It is mounted on a reasonably level floor or platform and the power circuit 66 connected to a suitable power source such as 110 volt 60 cycle alternating current. I find it desirable to ground the cabinet, power service conduit system and interior of the cabinet wall as represented schematically at 111 and 112 of Fig. 7.

Dry Ice represented generally in commercial block form at 15 is deposited in basket 20, the work set up in the working compartment 14 and the cabinet closed. The Dry Ice is pumped over as a gas into the working compartment by blower 35 under control of the thermostat 70 and heater system 63. Assuming that a temperature of minus 50 degrees F. is desired, thermostat 70 is set for this temperature and locked. Calibration can be made by observing a thermometer inside the working chamber and checking the thermometer reading the instant that the pilot lamp 82 is illuminated on the control panel exterior to the cabinet which shows the instant that the blower motor 28 is energized for the minus 50 degrees F. setting of thermostat 70.

*Operation of cabinet at —40 deg. to —100 deg. F.*

In order to operate the cabinet over ranges, for example, of —40° to —100° F. the Dry Ice compartment 20 is filled to the top with Dry Ice crushed to approximately egg size. It is advisable not to use powdered or too finely pulverized ice as it reduces the surface area, and, in turn, reduces the pull-down rate. The slide damper 48 located in the working compartment 14 in the upper left-hand corner is pulled wide open. The box will now rapidly pull down in temperature at the following rates:

From room to —40 deg. F.: Approximately 20 minutes.
From room to —100 deg. F.: Approximately 70 minutes.

However, when the box reaches a temperature of —90 degrees F., it may be necessary to recharge the dry ice compartment with more Dry Ice which, in turn, increases the surface area and rapidly brings the box down to —100 degrees F.

For any temperature control in the range of —40 degrees F. to —100 degrees F., the slide damper 48 should be adjusted to half-open position. Simply set the regulator 70 for the desired temperature in this range with the heat switch 65 in the "off" position, and it will give satisfactory regulation.

For temperatures from 0 degrees to —40 degrees F., the slide damper 48 should be in the ¼ open position.

When working at or near 0 degrees F. or above, it is advisable to put the Dry Ice in as large lumps as possible (normally 1 or 2 pieces which will fill compartment). This provides better control at these temperatures. It may also be necessary at any temperature from —20 degrees on up to room temperature to turn the heater switch 65 to low position to offset the refrigeration effect due to leakage through the interior insulation.

*Operation from room temperature to 220 degrees F.*

The same procedure is followed for setting the thermoregulator 70 for these higher temperatures. Any Dry Ice that may be present in the box should be removed, and the heater switch 65 turned to "high" until desired temperature is reached. It will require from 3 to 4 hours for the box to rise from room to 220 degrees F. with the switch on "high." Switch positions are as follows:

From room to 120 degrees F.: "low"
From 120 degrees F. to 160 degrees F.: "medium"
From 160 degrees F. to 220 degrees F.: "high"

In opening the lid of the box at the high temperatures, it is advisable that no fan or draft of cool air be made to strike the observation glass at the underside of the lid as sudden change of temperature might crack the glass.

*Safety thermostat*

In order to avoid dangerous conditions which might result from failure of the thermostat 70 to function, I provide a safety thermostat 116 in the heater circuit which will open at approximately 230 degrees F. preventing the box from rising any higher than this, thereby causing damage. This safety thermostat may be conveniently located on the lower left-hand of the heater frame 64.

Normal Dry Ice consumption at —100 degrees F. after the initial pull-down is approximately 2 lbs. per hour. Dry Ice consumption at —40 degrees F. is approximately 1.5 lbs. per hour. Dry Ice consumption at 0 degrees F., with heat switch on low heat (input 125 watts) is approximately 2 lbs. per hour. Dry Ice consumption at 0 degrees F., with no heat on and Dry Ice in one large piece, is approximately 1.25 lbs. per hour.

The equipment of my invention is highly practical inasmuch as Dry Ice is now commercially obtainable through wide distribution channels and provides a convenient means for securing refrigeration at the temperatures obtained in the system of my invention.

The only maintenance required with the equipment is the occasional oiling of the fan motor 58 and blower motor 28. Replacement of the pilot light 82 is readily made. It may be necessary to renew the heater coils 63a and 63b from time to time.

The apparatus of my invention has wide application in industry such as the shrinking of rivets for mass production riveting operations, the chilling of aluminum rivets to retard hardening and maintain them soft enough for driving; the storing of metal parts at low temperatures for conditioning the parts prior to use as in chilling the parts for expansion fitting; the treating of tool and other steels by chilling to produce desired characteristics otherwise difficult to obtain by ordinary methods of treatment; the accelerated aging of metals to prevent growth; the storing of serums, blood, chemicals, etc.; the testing of aircraft equipment and materials of every description for determining their durability, performance, etc. at low temperatures and as a food-freezing pilot plant. The portability of the equipment is one of its outstanding features in addition to its low cost and simplification of design for quantity production.

In the operation of the refrigeration apparatus of my invention the gas from the solidified gas compartment is accumulated in a confined area or column in the duct system 41—44 which serves as a trap from which the gas does not run out until the blower fan 35 is initiated in motion.

The confined column of gas is then lifted by the fan 35 and pumped through the work compartment for maintaining the sub-zero temperature thereon. This process of lifting and pumping the column of gas continues until the predetermined thermostat controlled temperature in the work compartment is reached.

Wherever in the specification and/or claims I may use the expression "dry ice" I desire that this be understood to mean any solidified gas. My invention is not restricted to the use of $CO_2$ as any solidified gas may be employed for securing the sub-zero temperatures obtainable in the apparatus of my invention.

Although I have described my invention in certain of its preferred embodiments, I realize that changes and modifications may be made and I intend no limitations upon my invention other than may be imposed by the scope of the appended claims.

What I claim as new and desire to secure by Letters Patent of the United States is as follows:

1. Heating and cooling apparatus comprising a cabinet having a work compartment and a solidified gas refrigeration compartment in communication, a constantly driven circulator fan in said work compartment, a heater associated with said fan, a carrier for solidified gas insertable into said solidified gas refrigeration compartment, a fan in said solidified gas refrigeration compartment, a driving means for the fan in said solidified gas refrigeration compartment for establishing circulating currents through said solidified gas compartment and through said work compartment, a power supply source for supplying power to said constantly driven circulator, and thermostatically controlled switching means for selectively connecting said heater and the driving means for the fan in said solidified gas compartment with said power supply source.

2. Heating and cooling apparatus comprising a cabinet having a work compartment and a solidified gas refrigeration compartment in communication, a constantly driven circulator fan in said work compartment, a heater disposed adjacent said fan, a carrier for solidified gas insertable into said solidified gas refrigeration compartment, a fan in said solidified gas refrigeraton compartment, a driving means for the fan in said solidified gas refrigeration compartment for establishing circulating currents through said solidified gas compartment and through said work compartment, a power supply source for supplying power to said constantly driven circulator, and thermostatically controlled switching means for alternately and selectively connecting said heater and the driving means for the fan in said solidified gas compartment with said power supply source.

3. Heating and cooling apparatus comprising a cabinet having a work compartment and a solidified gas refrigeration compartment in communication, a constantly driven circulator fan in said work compartment, a heater disposed adjacent said fan, a carrier for solidified gas insertable into said solidified gas refrigeration compartment, a fan in said solidified gas refrigeration compartment, a driving means for the fan in said solidified gas refrigeration compartment for establishing circulating currents through said solidified gas compartment and through said work compartment, a power supply source for supplying power to said constantly driven circulator, thermostatically controlled switching means for alternately and selectively connecting said heater and the driving means for the fan in said solidified gas compartment with said power supply source, and means associated with the fan in said solidified gas refrigeration compartment for controlling the volumetric transfer of gas between said compartments.

4. Heating and cooling apparatus comprising a cabinet having a work compartment and a solidified gas refrigeration compartment in communication, a constantly driven circulator fan in said work compartment, a heater disposed adjacent said fan, a carrier for solidified gas insertable into said solidified gas compartment, a driving means for the fan in said solidified gas refrigeration compartment for establishing circulating currents through said solidified gas compartments and through said work compartment, a power supply source for supplying power to said constantly driven circulator, thermostatically controlled switching means for alternately and selectively connecting said heater and the driving means for the fan in said solidified gas compartment with said power supply source, and a valve interposed between the fan in said solidified gas refrigeration compartment and said work compartment for regulating the volumetric transfer of gas between said compartments.

5. Heating and cooling apparatus comprising a cabinet having a work compartment and a solidified gas refrigeration compartment in communication, a constantly driven circulator fan in said work compartment, a heater associated with said fan, a carrier for solidified gas insertable into said solidified gas refrigeration compartment, a duct extending between a position adjacent the base of said solidified gas refrigeration compartment and a position adjacent the top of said work compartment, a fan disposed in said duct, a motor for driving said fan for circulating gas from said solidified gas refrigeration compartment through said work compartment, a power supply source for supplying power to said constantly driven circulator, and thermostatically controlled switching means for selectively connecting said heater and the driving means in said solidified gas compartment with said power supply source.

6. Heating and cooling apparatus comprising a cabinet structure including a solidified gas refrigeration compartment and a work compartment in communication, a blower in said solidified gas refrigeration compartment for pumping gas therefrom into said work compartment, a motor for driving said blower, a circulator associated with said work compartment, heater coils associated with said circulator, thermostatic control means associated with said work compartment, a power supply circuit, and means controlled by said thermostatic control means for selectively connecting either the heater coils or the driving motor for said blower to said power supply circuit according to the temperature conditions in said work compartment.

7. Heating and cooling apparatus comprising a temperature controlled cabinet including a solidified gas refrigeration compartment in communication and a work compartment, a motor driven blower unit in said solidified gas refrigeration compartment, a heater unit in said work compartment, a motor driven fan adjacent said heater unit, a power source, a thermostat located in said work compartment, circuits interconnecting said power source and said thermostat, a two-position relay controlled by said thermostat, a pair of contactors controlled by said relay, one pair of contactors being normally open when the other pair of contactors is normally closed, circuit connections between one pair of said contactors and said heater unit, and circuit connections between the other pair of contactors and said motor driven blower unit whereby said heater unit and said motor driven blower unit are selectively energized from said power source according to the position of said two-position relay.

NATHAN MORRIS.

REFERENCES CITED

The following references are of record in the file of this patent:

UNITED STATES PATENTS

| Number | Name | Date |
|---|---|---|
| 2,359,796 | Russell | Oct. 10, 1944 |